May 30, 1944.   P. C. DIXON   2,349,944
METHOD OF AND MEANS FOR SEPARATING LIQUID AND GAS OR GASEOUS FLUID
Filed Jan. 13, 1941   2 Sheets-Sheet 1
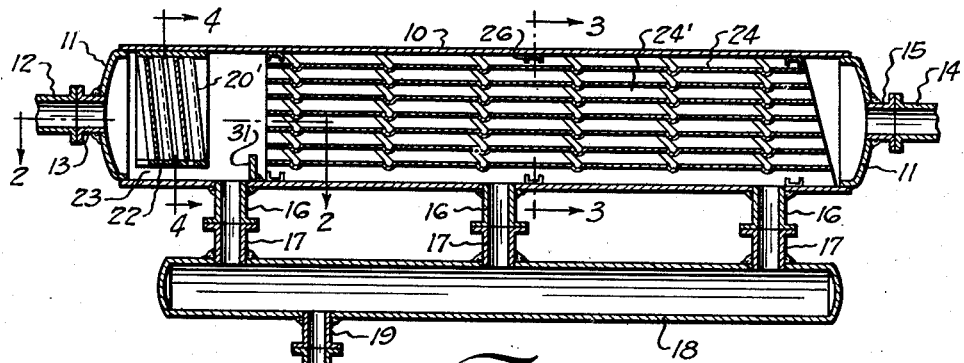
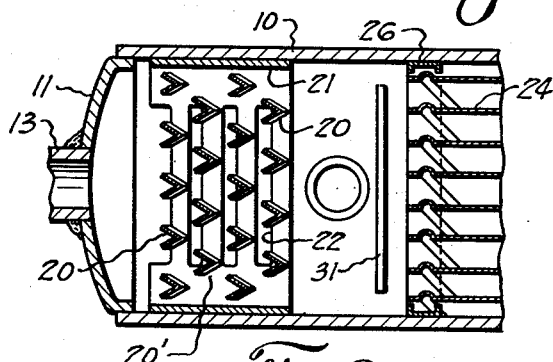
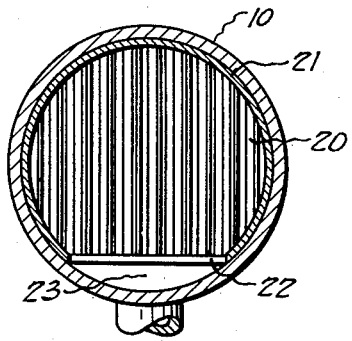
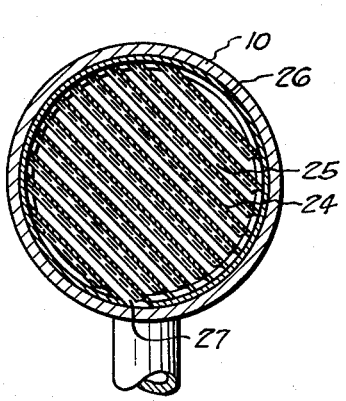
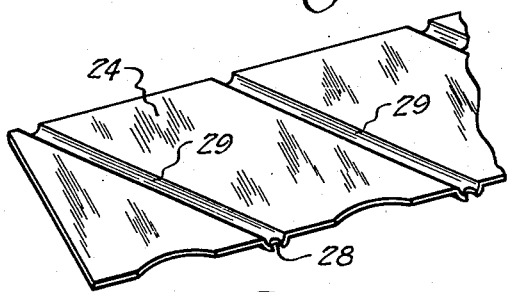
Inventor
Philip C. Dixon
By Jack A. Ahley
Attorney May 30, 1944.  P. C. DIXON  2,349,944
METHOD OF AND MEANS FOR SEPARATING LIQUID AND GAS OR GASEOUS FLUID
Filed Jan. 13, 1941  2 Sheets—Sheet 2
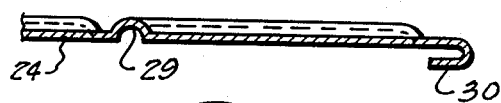
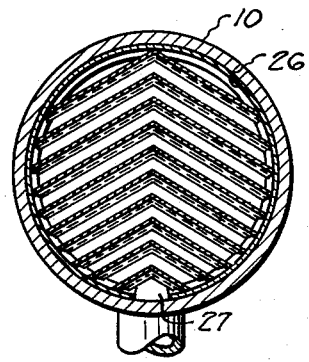
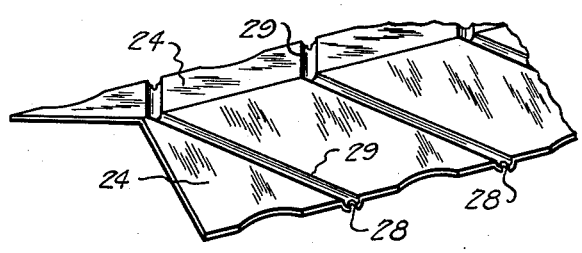
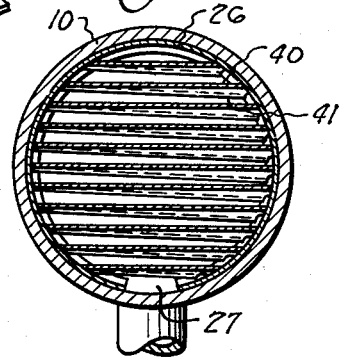
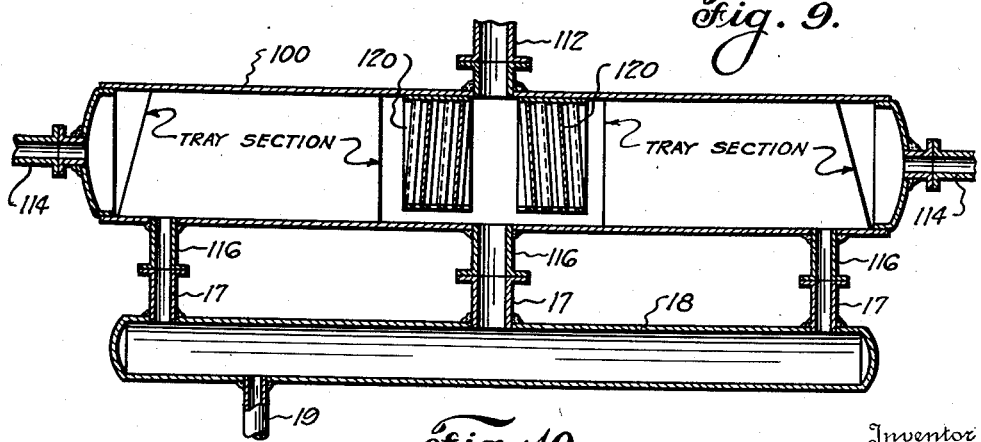
Inventor
Philip C. Dixon
By Jack A. Ethley
Attorney Patented May 30, 1944

2,349,944

UNITED STATES PATENT OFFICE 2,349,944

METHOD OF AND MEANS FOR SEPARATING LIQUIDS AND GASES OR GASEOUS FLUIDS

Philip C. Dixon, Houston, Tex., assignor to National Tank Company, Tulsa, Okla., a corporation of Nevada Application January 13, 1941, Serial No. 374,230

10 Claims. (Cl. 183—2.7)

This invention relates to new and useful improvements in methods of and means for separating liquids and gases or gaseous fluids.

One object of the invention is to provide an improved method and means for efficiently separating liquids from gases or gaseous fluids which are under high pressures, and particularly under such high pressures as exist within the pressure range of retrograde condensation, whereby hydrocarbon and other liquids may be separated from the gas and/or gaseous fluids and thereby recovered.

It is pointed out that under high pressures such as are present in the pressure range of retrograde condensation, liquid condensities are relatively low because of the relatively large volume of methane, ethane, propane and other gaseous fractions, in solution in the hydrocarbon liquid; and also, the inverse is true as to the density of the gas, and its density is higher in proportion as the pressure is increased or is relatively high. Under these conditions, the large volume of gas in solution results in the liquid fractions being very light and consequently, said liquid fractions do not easily settle out or precipitate and the segregation or separation of the gas from the liquid fractions is difficult.

It is well known that high pressure flowing well streams or high pressure streams from processing plants or systems, of the order of one thousand to several thousand pounds per square inch, usually include certain hydrocarbons carried in the liquid phase, certain hydrocarbons in the vapor phase and still other hydrocarbons in the mist or intermediate stage, and may include dehydrants, such as calcium chloride, ethylene glycol or other extraneous liquids. As a general rule, the greater the amount of hydrocarbon liquids contained in the flow stream, the greater the number of cubic feet of methane, ethane and heavier gases which are in the liquid phase in solution in the precipitated liquids; also, the separation pressure is a factor to be considered for it has been found that under higher separation pressure, more of the gases are held in solution as the equivalent of hydrocarbon liquids.

Whenever the pressure of the hydrocarbon fluids is reduced, a release of a portion of the gas in solution in the hydrocarbon liquid is effected, whereby the density of the hydrocarbon liquid, so-called, is increased and the density of the gas is decreased or reduced, correspondingly. Thus, if the hydrocarbon fluids are conducted through a certain size separator at 2,500 pounds pressure, the velocity of equivalent amounts of such fluids will be materially less than the velocity of the same amount of fluids under 750 pounds pressure through the same separator, all fluids being referred to conventional pressure and temperature base such as 14.7 pounds per square inch and 60 degrees Fahrenheit.

Therefore, when separating under relatively low pressures, such as of the order of 50# to 500# per square inch the velocity of the flow while efficiently separating may be quite high, as the density of the hydrocarbon liquid is relatively great and the density of the gas is correspondingly less under these conditions. However, under high pressures, such as exist above the base of the pressure range of retrograde condensation, the velocity of the same flowing fluid is lessened, with a less dense liquid and a more dense gas, whereby an entirely different problem of separation is presented, than where gaseous flow streams are separated below the base of the pressure range of retrograde condensation. Therefore, the principal problem to which the present method of separation is applied is that of separating vaporous, or mist phase liquids together with large quantities of normal gases in solution as equivalent liquids, and all under reduced velocities, from high pressure streams of gas and/or gaseous fluids.

It is an important object of this invention to provide an improved method of separating hydrocarbon fluids having a low liquid density and a high gas density, when flowing under high pressure and relatively low velocity, as well as removing separated liquids when present.

A particular object of the invention is to provide an improved method of separating liquids from gases or gaseous streams, flowing under pressures within the range of retrograde condensation which includes conducting the stream into an enlarged area and dividing said stream into a number of flow streams, then flowing said streams through elongate transversely restricted paths in said area at a low velocity while under such high pressure, whereby the liquid bearing bodies are given full opportunity to settle and collect on a surface whereby the collected liquid may be carried off, while the gas streams may be carried off with substantially little or no pressure reduction.

A particular object of the invention is to provide an improved method of separating hydrocarbon liquids and extraneous liquids from hydrocarbon gases or gaseous fluids, flowing under high pressure and relatively high velocity wherein the velocity of flow is reduced without substantially reducing the pressure and also wherein the globules or particles, which it is desired to separate from the gases or gaseous fluids, are caused to contact collecting surfaces before reaching the ends of their travel path while flowing under reduced velocities; and during which separation the gases or gaseous fluids, from which the globules or particles are separated, flow in longitudinal or elongate paths; also to provide apparatuses for efficiently and effectively carrying out the method.

An important object of the invention is to provide a method of the character described wherein the length of the path of travel of the globules or liquid-bearing particles is such as to assure precipitation of such globules or particles onto a baffling or collecting surface, under the velocity at which such globules or particles are traveling; and an apparatus wherein the baffling or collecting members are spaced in accordance with the rate of gravity descent of such globules or particles during a travel path of predetermined length under a given velocity of flow, whereby the diameter and length of the separator may remain constant over a wide range of flow condition.

Another object of the invention is to provide an improved separator which is relatively small in size, and which separator is adapted for use in separating fluids flowing under a high pressure, within the pressure range of retrograde condensation; the arrangement of the separator being such that its capacity may be increased in proportion to its length, whereby the diameter of the same may remain constant over a wide range of capacities of said separator.

A further object of the invention is to provide an improved separator which is so constructed that a large surficial collecting area is presented to the gaseous stream travelling therethrough, whereby liquid drops or particles may accumulate and collect on said surface and separation of liquid from the gas is accomplished; the internal arrangement of the separator being such that its capacity may be increased inversely in proportion to the spacing of the collecting surfaces or directly in proportion to the area of the collecting surfaces whereby the diameter and the length of the separator may remain constant over a wide range of capacities.

Still another object of the invention is to provide an improved separator, of the chaarcter described, wherein a plurality of surfaces, between which the fluids are directed, are disposed in such relation to each other that the separation of the gas is enhanced and also the discharge of liquid droplets which form and collect on the surfaces are prevented from being carried out of the separator with the gas through the gas outlet, whereby substantially complete separation of the gas from the liquid is assured.

Another object of the invention is to provide a separator, of the character described, having a plurality of collecting surfaces, spaced relatively close to each other for collecting and accumulating the liquid particles which fall downwardly, as a rule gradually, from the gaseous stream as it flows through the separator between said surfaces, whereby such liquid particles are separated from said stream; the arrangement being such that the capacity of the separator may be varied by adjusting the spacing between the collecting surfaces, so that the diameter and length of the separator may remain constant over a large range of capacities of said separators.

Still another object of the invention is to provide an improved separator which may include two or more sections or vessels connected to a common inlet for handling flow streams of larger volumes, whereby the velocity of the increased volumes may be reduced and thus afford a lower velocity during the passage of the stream through such sections, rather than through one separator section or vessel. By such an arrangement the same number of cubic feet per twenty-four hours may be accommodated, but at reduced pressures, and corresponding velocities (due to field pressure decline) and all without changing the former equipment. The velocity in feet of travel per second is thereby permitted to remain at an efficient point, and simple and ready attachment of additionally required sections or vessels may be made, economically.

The construction designed to carry out the invention will be hereinafter described together with other features of the invention.

The invention will be more readily understood from a reading of the following specification and by reference to the accompanying drawings, as an example of the invention is shown and wherein:

Figure 1 is a longitudinal, sectional view of a separator, constructed in accordance with the invention, Figure 2 is an enlarged horizontal, sectional view, taken on the line 2—2 of Figure 1, Figure 3 is a transverse, vertical, sectional view, taken on the line 3—3 of Figure 1, Figure 4 is a transverse, vertical, sectional view, taken on the line 4—4 of Figure 1, Figure 5 is a partial, isometric view of one of the separating trays, Figure 6 is an enlarged longitudinal, sectional detail of the end of one of the trays, Figure 7 is a view, similar to Figure 3, showing a modified form of separating unit, Figure 8 is a view, similar to Figure 5, of a modified form of separating tray, Figure 9 is a view, similar to Figure 3, showing still another form of separating unit, and Figure 10 is a longitudinal, sectional view of a modified form of separator.

In the drawings, the numeral 10 designates a cylindrical tank which is preferably disposed in a horizontal position or approximately so. The diameter of the tank is relatively small as compared to its length and the inlet end of said tank is closed by a flanged head 11, which is welded, or otherwise suitably secured thereto. An inlet pipe 12 has connection with a flanged collar 13 which is disposed axially of the head 11, whereby a stream may be conducted into the interior of the tank 10. The opposite end of the tank is provided with a gas outlet pipe 14 which is connected to a flanged collar 15 extending axially from a gas outlet head 11, similar to the head 11 and secured to the tank in a like manner.

A plurality of liquid outlet pipes 16 extend downwardly from the tank 10 and as illustrated in Figure 1, three of these pipes are provided, said pipes being spaced substantially equally throughout the longitudinal length of the tank body, and forming a support therefor. Each pipe 16 is coupled to the end of a pipe 17, which latter pipes extend upwardly from a liquid reservoir 18. The liquid reservoir is preferably cylindrical in cross-section and is relatively elongate, being shown as substantially the same length as the tank. The liquid reservoir 18 has a liquid discharge pipe 19 extending from the bottom thereof. The tank 10, as well as the liquid reservoir 18, are illustrated in Figure 1 as being disposed in a horizontal plane and it is preferable that the device be so located; however, the invention is not to be limited to the horizontal disposition of the tank for it may be disposed at any desired inclination. The reservoir 18 may be suitably supported.

The gaseous or mixed stream is conducted into the tank 10 through the inlet pipe 12 and collar 13. Within the tank adjacent the inlet a liquid extracting unit 20' is suspended from the top of the tank in the path of influent stream. The unit includes a surrounding band 21 which has its outer periphery welded, or otherwise secured to the inner wall of the tank. The lower portion of the band or ring is flattened so as to extend transversely across the interior of the tank above the bottom thereof, and this portion is formed with horizontally extending slots 22 which are located below upright and forwardly inclined baffles 20. Each baffle 20 is substantially V-shaped in cross-section and has its upper end secured to the inner periphery of the ring 21. These baffles are disposed in rows extending transversely of the interior of the tank (Figure 2). The baffles of each row have their open sides facing toward the inlet and are staggered with relation to the baffles of the adjacent rows, whereby the fluids striking said baffles are caused to take a circuitous or tortuous path around and between said baffles. The lower end of each baffle rests upon the lower portion of the supporting ring which is spaced from the tank wall, whereby a flow passage or space 23 (Figure 1) is provided between the bottom of the baffle unit and the tank wall.

It is pointed out that the deflector baffles are disposed between the inlet to the tank 10 and the first outlet pipe 16 which extends through the tank wall. Manifestly, the stream entering the tank 10 will immediately contact the deflector baffles 20 and free liquids, either hydrocarbon or otherwise, entrained in the stream will be trapped by the baffles and caused to flow downwardly thereon, the gas, gaseous fluids and liquid fractions, in a more or less dispersed state, passing on through between the baffles. The liquid which flows downwardly on the deflector baffles passes through the slots 22 in the support 21, into the flow space 23, and then downwardly through the liquid outlet pipe into the liquid reservoir 18 through the pipe 17.

Beyond the liquid extracting unit 20', the major portion of the interior of the tank is occupied by a separating unit 24', which is formed of a plurality of spaced circular channel members 26 and substantially flat trays 24 extending therethrough. The trays are preferably inclined from the horizontal and extend transversely across the tank (Figure 3) and are spaced one above the other and relatively close to each other to provide longitudinal flow passages 25 therebetween. The longitudinal edges of said trays are welded, or otherwise secured to the channel members, which in turn are fastened to the tank wall. Each channel member has a portion thereof cut out or removed, as shown at 27, such portion being located at the bottom of the tank in longitudinal alinement with the outlets 16, whereby an unrestricted flow of liquid within the tank below the lowermost tray may be had.

By disposing the trays at an incline, with respect to a horizontal plane, any liquid which accumulates on said trays drains downwardly toward the lower sides thereof. Each tray has its longitudinal edge portion along the low side thereof recessed at 28 adjacent the tank wall, whereby the liquid from said tray may flow from the tray downwardly on tank wall and then to the liquid outlets 16. To facilitate drainage of liquid from the upper surface of the trays, each tray is provided with ducts or grooves 29 which are formed by depressing the material of which the tray is constructed. These grooves are preferably disposed at an angle forward with relation to the flow of the streams and the longitudinal axis of the tank, whereby the force of the gaseous fluid flowing through the flow spaces 25 between the trays 24 will tend to empty the channels of liquid which may accumulate therein. The end of each tray 24 which is located near the gas outlet 15 may be bent downwardly upon itself to form a transverse deflector 30, overhanging the passage 25 below and acting to prevent liquid from being carried into the gas outlet by the flow of the gaseous stream exiting from the separator tank; however, it is the principal feature of the invention to make the separating unit either long enough or of such configuration as to extract substantially all of the recoverable liquid before the stream reaches the end of said unit. As illustrated, the trays are progressively lengthened from the top to the bottom of the tank, whereby the end of the unit adjacent the gas outlet is included.

The separator is particularly adapted for use in separating gases and liquids of a flowing stream when said stream is under high pressures, and particularly such high pressures as occur within the pressure range of retrograde condensation, whereby the separation may be effected without substantially reducing said pressures. As explained, under high pressures, the densities of the liquid and vapor phases of the stream more nearly approach each other than in streams under low pressures and for this reason, the liquid particles require more time to fall through a specific distance while flowing in the gas phase, than when flowing under the lower pressures.

In the operation of the separator, and in carrying out the improved method, the high pressure fluid stream is introduced into the tank 10 through the collar 13 from the inlet pipe 12. As has been pointed out the high pressure stream flows at a less velocity than a low pressure stream, and upon its introduction into the tank, its velocity is further reduced since it passes into a larger space. Upon entering the separator, the fluid stream immediately contacts the inclined deflector baffles 20 and said baffles act to remove substantially all of the free liquids flowing in the stream, which liquids may be hydrocarbon or otherwise. These liquids flow downwardly on the baffles 20, through the slots 22 in the support 21, through the flow space 23 and finally out through the first outlet pipe 16 to the liquid reservoir 18. A transverse dam or baffle 31 is located within the tank adjacent the downstream side of the first outlet pipe 16 and serves to build up a slight hydrostatic head over the outlet, whereby the liquid is caused to pass through the first outlet before overflowing said dam and escaping from the other outlets.

After flowing between the deflector baffles 20, the gaseous fluids enter and flow as individual streams, through the flow passages 25 formed between the inclined trays or plates 24, the latter providing amplified collecting surfaces. As the streams flow through the longitudinal passages, the liquid particles in the stream gradually descend or fall downwardly and upon striking the trays adhere thereto and accumulate thereon. The trays are spaced sufficiently close to each other and are of such length that the liquid particles or liquid-bearing bodies entrained in each gas stream, while travelling at a given velocity will fall sufficiently to engage a tray surface before completing its passage through the tray assembly. Due to the difference in the density of the gas and liquid in the stream and also due to the fact that in the flow of this component mixture, the more dense, or liquid phase particles, will fall or descend downwardly at some velocity, it is manifest that by properly spacing the trays, the liquid particles touch and adhere to a collecting surface before completing their travel through the tray assembly. As the liquid particles accumulate on the surfaces of the trays, several particles agglomerate until the globules or bodies so formed have sufficient weight to flow by gravity downwardly on the tray surfaces and then down the tank wall to the outlets 16.

The liquid particles or liquid-bearing bodies must be given an opportunity to settle out of the flow stream within a predetermined limit of travel. By spacing the trays in accordance with the curve of precipitation or fall of the entrained liquid bodies, at a given flow velocity, the length of the travel or flow of the gaseous stream may be shortened; however, the spacing must be ample to permit maximum precipitation. The term "liquid bodies" or "liquid-bearing bodies" as used in the description and claims has reference to the particles or globules which are entrained or suspended in the gas stream and which may comprise gas in solution, solid liquid particles, and/or a mixture of the same. While it is desirable to remove the liquid fractions from the flow stream expeditiously so as to prevent subsequent entrainment in said stream, it is highly necessary to allow sufficient travel where precipitation is depended upon.

The separator is efficient in its operation and its capacity may be readily varied by varying the spacing or length of the trays or the diameter of the tank. For any given flow stream, the liquid particles will fall a certain distance in a certain length of time. Assuming that in a particular flow stream, the liquid particles fall at the rate of 1" per second, and the stream is flowing through the separator at a velocity of 10' per second, it will be evident that the liquid particles will fall 1" in every 10'. In order to efficiently effect separation of the liquid and gas phases, the trays must be 10' in length and spaced 1" apart; or the trays could be 5' in length and spaced ½" apart; or the length of the trays could be increased to 20' and the spacing increased to 2". From this it becomes obvious that by varying the number of trays or by changing the length and diameter of the tank, the capacity of the separator may be varied over a wide range. Since the capacity of the separator is inversely proportional to the spacing between adjacent trays, the trays may be made of very thin material and may be spaced close together to provide a separator having a small size and yet, having tremendous capacity.

In Figures 1 to 5, the trays 24 are illustrated as substantially flat and disposed in a position inclined from a horizontal plane. The particular construction of the trays is subject to variation and as shown in Figures 7 and 8, each tray may be angular in cross-section, with the apex of the tray in substantial vertical alinement with the vertical center of the tank. Manifestly, the liquids accumulating on this type of tray will readily flow downwardly on the inclined surfaces of said tray to the wall of the tank.

It would be possible to provide a plurality of horizontal trays 40 within the tank, in place of the inclined trays 20 and this arrangement is shown in Figure 9. Each tray 40 is formed with drainage channels 41, similar to the channels 29 in the trays 24. However, the channels 41 have their bottoms inclined so as to facilitate drainage of the liquid therefrom by gravity.

In Figures 1 to 9, collecting surfaces in the form of trays or plates are shown and described for the purpose of providing, accumulating or collecting surfaces for the liquid to effect separation of the liquid particles from the gaseous stream.

A modified form of the invention is illustrated in Figure 10 wherein a tank 100 is provided. This tank has a well fluid inlet 112 at its central portion, such inlet extending radially of the tank 100. Within the interior of the tank and on each side of the inlet 112, a set of the deflecting baffles 120 are provided. The gaseous fluid stream which enters through the inlet 112 will of course divide, one portion travelling in one direction with the remainder travelling in the other direction, whereby two streams flowing toward the ends of the tank 100 are produced. Between each set of deflecting baffles 120 and the end of the tank 100, a tray assembly or baffle assembly, as shown in Figures 1 and 9, is disposed. Thus, it will be seen that in this arrangement, the flow stream is divided and each separate stream is passed through a set of deflecting baffles 120 then through either a tray or baffle assembly, as the case may be. Each end of the tank 100 is provided with a gas outlet 114. The liquid which is separated by the trays 122 escapes through discharge pipes 116 which extend radially from the tank 100. These outlet pipes have connection with the pipe 17 of the liquid reservoir 18.

The operation of this form of the invention is substantially the same as the forms shown in Figures 1 and 9 with the exception that two flow streams are passing through the tank 100 at all times. By providing the inlet at the center of the tank, the velocity of the flow through the tank is materially reduced and this aids in promoting the separation of the liquid from the gas. Of course, it is obvious that any desired tray or baffle assembly as illustrated in Figures 1 to 9 may be employed in this form of the invention.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a separator for separating liquid from gas, the combination of an elongate substantially horizontal tank having an inlet at one end and an outlet at the other end, a plurality of superposed smooth and continuous flat plates extending longitudinally in said tank providing longitudinal flow paths, whereby turbulence at the velocity at which the streams are flowing is reduced to such a minimum as to cause suspended liquid-bearing bodies to descend by gravity, each plate having therein spaced transverse ducts and amplified flat liquid collecting and conducting areas between said ducts for periodically collecting and carrying off said bodies.

2. A liquid separator unit including, a plurality of elongate smooth flat plates spaced closely one above the other and each provided with transverse grooves, and a plurality of enclosing and supporting members within which the plates are disposed and to which the edges of the plates are secured, whereby the unit may be inserted in a tank as a unit.

3. A separator adapted to separate suspended liquid bodies from high pressure hydrocarbon gas streams wherein the ratio of gas to liquid is high including, an elongate non-vertical tank having a reduced inlet at one end for the high pressure gas stream and reduced outlet at its opposite end, a plurality of long longitudinal smooth plates within the tank unobstructed at their ends and providing a plurality of transverse open ended elongated gas passages through which the gas flows rectilinearly and wherein liquid bodies due to their specific gravities fall to the plates prior to reaching the ends thereof and are agglomerated in liquid bodies on said plates, ducts spaced at intervals in said plates for carrying off the liquid bodies from the plates, and means for discharging the collected liquids from the tank.

4. The method of separating liquid bodies flowing in suspension from gases of the order of methane and ethane flowing therewith under high pressure in a hydrocarbon stream in which such gases greatly predominate which includes, reducing the velocity of the flowing stream to a point where substantially minimum turbulence is obtained under high pressure, continuing the flow of the stream at such reduced velocity under high pressure and separating liquid bodies from the gases in two stages in a continuous general longitudinal course while the components of the stream are concurrently flowing at such reduced velocity, the first of which stages includes scrubbing liquids from the stream and carrying such liquids out of the longitudinal flow path at a point prior to the entrance of the stream into the second stage while spreading the gas and maintaining its general longitudinal course, and the second of which stages includes dividing the residual stream and flowing the divisions thereof through said general longitudinal course in a series of unobstructed and rectilinear broad shallow channels under minimum turbulence, maintaining said stream divisions in said channels until suspended liquid bodies have descended due solely to their own specific gravities, agglomerating the fallen liquid bodies into larger bodies to prevent the gases again picking up said bodies, and carrying the liquids out of the channels.

5. In a separator for separating suspended liquid bodies from gases in high pressure well streams, the combination of an elongate non-vertical tank having imperforate outer walls and a relatively small inlet at one end and a relatively small outlet at the opposite end, whereby the velocity of a high pressure hydrocarbon stream entering said tank is reduced so as to flow therethrough with a minimum turbulence and in a general longitudinal course, a liquid extractor in the tank adjacent the inlet and in said general longitudinal course having tortuous passages for the gases, a separating unit in said tank disposed longitudinally between the liquid extractor and the outlet, said unit being spaced from the extractor and including superposed flat plates extending longitudinally of the unit to provide open ended elongate ribbon-like channels therebetween, the plates being of such lengths as to allow the suspended liquid bodies flowing in the longitudinal stream to descend thereto solely by their specific gravities before reaching the ends thereof, the plates being spaced from each other in accordance with a predetermined rate of descent in a stream flowing at a predetermined velocity between plates of predetermined length to cause the liquid bodies to collect on said plates and agglomerate into larger liquid bodies at relatively frequent intervals, whereby the flowing gases are prevented from picking up said liquid bodies, and means for carrying off liquids from the plates and from the tank.

6. A separator as set forth in claim 5 wherein the plates are provided with grooves for carrying off the agglomerated liquids.

7. A separator as set forth in claim 5 and an elongate collecting tank underlying and connected to the separator tank.

8. A separator adapted to separate suspended liquid bodies from a high pressure hydrocarbon gas stream wherein the ratio of hydrocarbon gas to liquid is very high including, an elongate non-vertical tank adapted to carry a high pressure having imperforate enclosing walls and provided with a reduced inlet at one end and a reduced outlet at its opposite end, whereby the velocity of the flowing high pressure gas stream entering the inlet is reduced, an upright liquid extracting element in the tank adjacent the inlet having tortuous passages therethrough in the general longitudinal path of the inflowing stream, a plurality of substantially vertically spaced longitudinal flat plates in the tank in longitudinal alinement with the passages of the liquid extracting element and spaced therefrom, said plates extending continuously thereacross from one enclosure wall of the tank to the opposite enclosure wall of the tank, said plates also being unobstructed at each end to provide open-ended elongate shallow channels intermediate their open ends, whereby the gas stream is caused to flow between said plates under minimum turbulence to permit said liquid bodies to descend and agglomerate into larger liquid bodies on said plates, means for carrying the agglomerated liquids from the plates, and means for discharging said liquids from the tank.

9. The continuous method of separating and agglomerating suspended liquid-bearing bodies from hydrocarbon gas by flowing a predominately gaseous stream in which said bodies are in suspension through a plurality of stages in a continuous generally longitudinal course which includes, initially reducing the velocity and turbulence of the stream flowing continuously and longitudinally under high pressure, dividing the stream and flowing the same through a series of tortuous paths for scrubbing liquids from the stream, combining said streams into a single stream, dividing the single stream and flowing the same through a series of parallel substantially unobstructed and substantially rectilinear shallow paths, maintaining said divided stream in said shallow paths until said liquid bodies have descended out of the gas due to their own specific gravities, agglomerating the descending liquid bodies into larger liquid bodies to prevent the gases again picking up said bodies, and carrying the agglomerated liquid bodies out of said paths.

10. In a separator for separating liquid from gas, the combination of an elongate substantially horizontal tank having an inlet and an outlet, a unitary liquid separator assembly including a plurality of transversely disposed spaced supporting members mounted between the inlet and outlet and engaging the wall of the tank throughout substantially their entire lengths so as to be supported thereby, and a plurality of elongate smooth flat plates spaced closely one above the other throughout substantially the entire cross-sectional area of the tank, said plates being disposed between and supported at their edges by said supporting members.

PHILIP C. DIXON.